United States Patent [19]

Devaud

[11] 4,372,702
[45] Feb. 8, 1983

[54] PISTON AND ROD ASSEMBLY FOR SLIDING IN A CYLINDER

[75] Inventor: Gerard L. Devaud, Paris, France

[73] Assignee: Societe d'Applications des Machines Motrices, Issy-les-Moulineaux, France

[21] Appl. No.: 227,112

[22] Filed: Jan. 21, 1981

[30] Foreign Application Priority Data

Jan. 25, 1980 [FR] France ................ 80 01590

[51] Int. Cl.³ .............................................. F16D 1/06
[52] U.S. Cl. .................................... 403/24; 403/360; 92/172
[58] Field of Search ......... 403/326, 375, 360, DIG. 7, 403/24; 92/172, 255

[56] References Cited

U.S. PATENT DOCUMENTS 3,279,835 10/1966 Krohm ............................... 403/326
3,807,285 4/1974 Phillips ................................ 92/255

Primary Examiner—Andrew V. Kundrat
Attorney, Agent, or Firm—Sughrue, Mion, Zinn, Macpeak and Seas

[57] ABSTRACT

The piston comprises two annular members which are mounted without clearance on a tubular rod. The main annular member receives in a counter bore the other annular member without clearance. The assembly is achieved by means of a mutual forming over of the two annular members which pre-stresses a rigid ring in a groove in the rod, this ring being interposed between the two annular members. The main annular member has a second formed over portion which is engaged in a groove in the rod and is capable of performing the function of the first mentioned forming over in the event of failure of the latter.

Application in control cylinder devices of helicopters.

4 Claims, 2 Drawing Figures

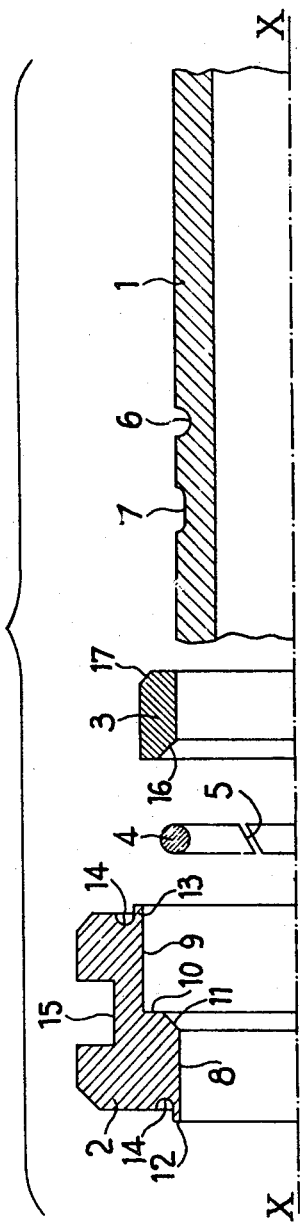
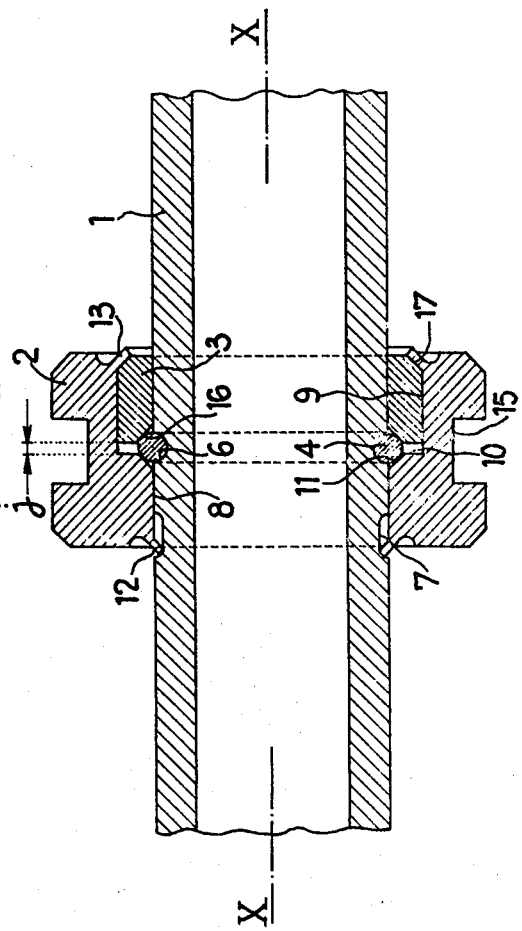

PISTON AND ROD ASSEMBLY FOR SLIDING IN A CYLINDER

DESCRIPTION

The present invention relates to a piston and rod assembly adapted to slide in a cylinder, this assembly comprising a mounted piston which has two annular members which have a bore corresponding to the outside diameter of the rod, and a split ring partly engaged in an annular groove in the rod and interposed between the two annular members.

In the known piston and rod assemblies of this type (see for example British Pat. No. 917 413), the two annular members of the piston merely abut the ring which transmits to the rod the axial forces exerted on the piston in both directions. This arrangement is unsuitable for applications in which high precision and high reliability, and even complete safety, are required, such as for example in the construction of flight control cylinder devices for aircraft.

An object of the invention is to provide a piston and rod assembly which satisfies these requirements in a cheap way.

The invention provides a piston and rod assembly of the aforementioned type, wherein the ring is pre-stressed in the groove between the two annular members.

A particularly simple and cheap way of achieving the pre-stressing of the ring consists in assembling the two members with each other by a mutual forming over.

If moreover the annular member providing the forming over has, on the side thereof opposed to the other member, a secondary axial extension formed over toward the axis of the rod so as to provide a secondary forming over in a second groove in the rod, the piston and rod assembly is "fail-safe" as concerns forces exerted on the piston in both directions, i.e. is completely safe.

The rod may be advantageously tubular in order to render it light and cheap.

Further features and advantages of the invention will be apparent from the ensuing description which is given merely by way of example with reference to the accompanying drawing in which:

FIG. 1 is an exploded half-longitudinal sectional view of a piston and rod assembly according to the invention before assembly of its component parts; and FIG. 2 is also a longitudinal sectional view of the assembly after the assembly of its parts.

The piston and rod assembly shown in FIGS. 1 and 2 comprises four metal members, namely a tubular rod 1, a piston body 2, a clamping member 3 completing the piston, and an O-section split ring 4. Apart from the split 5 in the latter, all these members are of revolution about a common axis X—X which will be assumed to be horizontal for purposes of the description.

The rod 1 is a section of a tube in the outer surface of which have been provided two grooves: a groove 6 having a semi-circular section whose radius is the same as the section of the ring 4 and, at a distance from the groove 6, a groove 7 having a rectangular section. The radially inner end of the groove 7 is connected to the lateral walls thereof by radiused fillets.

The piston body 2 has a roughly rectangular section which defines internally a main bore 8 on one half of its length and a counterbore 9 of larger diameter in the remainder of its length. A radial shoulder 10 defined between the bores 8 and 9 is connected to the first bore 8 by a frustoconical surface 11 which is inclined at about 45°. Each bore 8, 9 is extended beyond the radial end surfaces of the body 2 by the inner surface of a thin annular skirt portion 12 and 13 respectively which axially slightly projects from the body 2. The outer surface of each skirt portion 12, 13 is connected to the radially extending end surface of the body 2 by an annular groove 14 formed in this surface.

The outer surface of the piston body 2 is provided, half-way along the length of the piston body 2, with a groove 15 of rectangular section adapted to receive a sealing element (not shown).

The clamping member 3 has a rectangular section whose inner corner adjacent body 2 is chamfered at 45° in the same way as the outer opposite corner so as to form frustoconical surfaces 16 and 17 respectively.

The outside diameter of this member 3 is equal to the diameter of the counterbore 9 of the body 2 and its inside diameter is equal to the diameter of the bore 8 and to the outside diameter of the rod 1.

For purposes of assembly, the members 2 to 4 are mounted on the rod 1 in such manner that the split ring 4 clips into the groove 6 and is located between the members 2 and 3. These two members are thereafter moved together, the member 3 entering without clearance the counterbore 9, until the two opposed frustoconical surfaces 11 and 16 are applied against the part of the ring 4 outside the groove 6.

A main forming over is then effected by forming over the skirt portion 13 toward the axis X—X onto the surface 17. This forming over pre-stresses the ring 4 in the groove 6 and prevents any possibility of play between the various members of the assembly. Moreover, it ensures the seal between the members 2 and 3. In order to guarantee the effectiveness of this forming over, an axial clearance J exists between the shoulder 10 of the body 2 and the adjacent radial surface of the member 3.

A secondary forming over is effected by forming over the skirt portion 12 toward the axis X—X so as to cause it to enter the groove 7. The diamensions are such that the end of this skirt portion is then located in the immediate vicinity of the radiused corner of the groove 7 which is the most remote from the groove 6. This secondary forming over ensures both the seal between the body 2 and the rod 1 and complete safety of the assembly, as will be explained hereinafter.

In use, the piston and rod assembly provided with its sealing element slides without clearance in a cylinder which, for example, belongs to a flight control cylinder device of a helicopter.

When a force in a direction parallel to the axis X—X is exerted on the piston 2-3 toward the member 3, i.e. toward the right as viewed in FIG. 2, this force is transmitted to the rod 1 through the conical surface 11 and the split ring 4. The latter is under shear stress and it is easy to dimension the various component parts in such manner as to achieve complete reliability.

In respect of a force exerted in the opposite direction (toward the left as viewed in FIG. 2), this force is transmitted to the rod through the skirt portion 13, the member 3 and the ring 4. The mechanical resistance depends on the skirt portion 13 which is subjected to bending stress. The dimensions are such that this skirt portion is capable of withstanding the maximum expected forces, bearing in mind the safety factor.

However, if for any extremely unlikely reason the skirt portion 13 nonetheless gives way, the secondary skirt portion 12 becomes jammed against the adjacent radiused corner of the groove 7 and directly transmits the force of the body 2 to the rod 1 while being subjected to shear stress. The dimensions of this skirt portion 12 enable it to withstand the predicted limit forces.

Thus the piston and rod assembly is "fail safe" in both directions of the forces applied on the piston, which enables it to be employed in vital control components of aircraft.

By way of a modification, the ring 4 may be formed by the combination of two half-rings.

Having now described my invention what I claim as new and desire to secure by Letters Patent is:

1. A piston and rod assembly for sliding in a cylinder, said assembly comprising a piston which has two annular members which define bores whose diameters correspond to an outside diameter of the rod, an annular groove in the rod, and a rigid ring partly engaged in the annular groove and interposed between the two annular members, the ring being in a pre-stressed condition in the groove between the two annular members, a first member of said annular members constituting a body of the piston and defining a counterbore in which a second member of said annular members is fitted, and the first annular member having adjacent the periphery of the entrance of the counterbore an axial extension which is formed over toward the rod onto the second annular member so as to hold the two annular members assembled together on the rod, the rod having a second annular groove and said first annular member having, on a side thereof opposed to the second annular member, a secondary axial extension which is also formed over toward the rod into the second groove of the rod so as to retain said first annular member on the rod.

2. A piston and rod assembly according to claim 1, wherein the second groove has a substantially rectangular section.

3. A piston and rod assembly according to claim 1 or 7, wherein each extension is in the form of an annular skirt portion.

4. A piston and rod assembly for sliding in a cylinder, said assembly comprising a piston which has two annular members which define bores whose diameters correspond to an outside diameter of the rod, an annular groove in the rod, and a rigid ring partly engaged in the annular groove and interposed between the two annular members, the ring being in a pre-stressed condition in the groove between the two annular members, a first member of said annular members constituting a body of the piston and defining a counterbore in which a second member of said annular members is fitted, means for interconnecting the first member and the second member longitudinally of the rod, the rod having a second annular groove and said first annular member having, on a side thereof opposed to the second annular member, an axial extension which is formed over toward the rod into the second groove of the rod so as to retain said first annular member on the rod.

* * * * *